(12) United States Patent
Son et al.

(10) Patent No.: US 12,086,940 B2
(45) Date of Patent: Sep. 10, 2024

(54) IMAGE PROCESSING METHOD AND APPARATUS

(71) Applicant: SAMSUNG ELECTRONICS CO., LTD., Suwon-si (KR)

(72) Inventors: Minjung Son, Suwon-si (KR); Hyun Sung Chang, Seoul (KR); Inwoo Ha, Seongnam-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 152 days.

(21) Appl. No.: 17/832,847

(22) Filed: Jun. 6, 2022

(65) Prior Publication Data

US 2023/0206562 A1 Jun. 29, 2023

(30) Foreign Application Priority Data

Dec. 28, 2021 (KR) .......... 10-2021-0189898

(51) Int. Cl.
| | |
|---|---|
| *G06T 17/00* | (2006.01) |
| *G06N 3/045* | (2023.01) |
| *G06T 17/20* | (2006.01) |
| *G06T 19/20* | (2011.01) |

(52) U.S. Cl.
CPC .......... *G06T 17/205* (2013.01); *G06N 3/045* (2023.01); *G06T 19/20* (2013.01); *G06T 2219/2004* (2013.01); *G06T 2219/2024* (2013.01)

(58) Field of Classification Search
None
See application file for complete search history.

(56) References Cited

U.S. PATENT DOCUMENTS

| | | | |
|---|---|---|---|
| 8,705,892 B2 | 4/2014 | Aguilera et al. | |
| 9,706,135 B2 | 7/2017 | Gillard et al. | |
| 10,482,574 B2 | 11/2019 | Adsumilli et al. | |
| 10,692,277 B1 | 6/2020 | Sunkavalli et al. | |

(Continued)

FOREIGN PATENT DOCUMENTS

| | | | |
|---|---|---|---|
| KR | 2000-0000823 A | 1/2000 | |
| KR | 2003-0035716 A | 5/2003 | |

(Continued)

OTHER PUBLICATIONS

Extended European search report issued on May 19, 2023, in counterpart European Patent Application No. 22193592.7 (8 pages in English).

(Continued)

*Primary Examiner* — Martin Mushambo
(74) *Attorney, Agent, or Firm* — NSIP Law (57) ABSTRACT

An image processing method is provided. The method includes generating appearance information corresponding to a canonical space defined by a cube including a plurality of regular grids in a first input image by implementing a first neural network, generating geometric information corresponding to a standard space in a second input image by implementing a second neural network, deforming the plurality of regular grids based on the generated geometric information, generating standardized image information by applying the appearance information to the plurality of deformed regular grids, and generating an output image based on the standardized image information.

22 Claims, 8 Drawing Sheets

(56) References Cited

U.S. PATENT DOCUMENTS

| | | | |
|---|---|---|---|
| 10,706,699 | B1* | 7/2020 | Kerzner .................. G06T 7/521 |
| 10,909,746 | B1* | 2/2021 | Kantar .................. G06V 20/647 |
| 2020/0294271 | A1 | 9/2020 | Ilola et al. |
| 2021/0056668 | A1* | 2/2021 | Barnes ................. H04N 1/3872 |
| 2021/0303935 | A1* | 9/2021 | Ma ........................ G06F 18/241 |
| 2021/0350620 | A1* | 11/2021 | Bronstein .............. G06N 20/00 |
| 2021/0383586 | A1* | 12/2021 | Bao ........................ G10L 21/10 |
| 2022/0284663 | A1 | 9/2022 | Ha et al. |

FOREIGN PATENT DOCUMENTS

| | | |
|---|---|---|
| KR | 10-0446635 B1 | 9/2004 |
| KR | 10-2007-0050878 A | 5/2007 |
| KR | 10-0788704 B1 | 12/2007 |
| KR | 10-0799990 B1 | 1/2008 |
| KR | 10-2008-0069888 A | 7/2008 |
| KR | 10-1963200 B1 | 3/2019 |

OTHER PUBLICATIONS

Hu, Ronghang, et al. "Worldsheet: Wrapping the world in a 3d Sheet for View Synthesis From a Single Image." *Proceedings of the IEEE/CVF International Conference on Computer Vision.* 2021, pp. 12528-12537 (10 pages in English).

Wiles, Olivia, et al. "Synsin: End-to-End View Synthesis From a Single Image." *Proceedings of the IEEE/CVF Conference on Computer Vision and Pattern Recognition.* 2020, pp. 7467-7477 (11 pages in English).

Zhou, Tinghui, et al. "Stereo Magnification: Learning View Synthesis Using Multiplane Images." *arXiv:1805.09817 vol. 1 [cs.CV] May 24, 2018.* (12 pages in English).

Srinivasan, Pratul P., et al. "Pushing the Boundaries of View Extrapolation with Multiplane Images." *Proceedings of the IEEE/CVF Conference on Computer Vision and Pattern Recognition.* 2019. pp. 175-184 (10 pages in English).

Tucker, Richard, et al. "Single-View View Synthesis with Multiplane Images." *Proceedings of the IEEE/CVF Conference on Computer Vision and Pattern Recognition.* 2020. pp. 551-560 (10 pages in English).

3D Photography (Facebook) https://www.facebook.com/help/414295416095269, pp. 1-4.

* cited by examiner

IMAGE PROCESSING METHOD AND APPARATUS

CROSS-REFERENCE TO RELATED APPLICATIONS

This application claims the benefit under 35 USC § 119(a) of Korean Patent Application No. 10-2021-0189898, filed on Dec. 28, 2021, in the Korean Intellectual Property Office, the entire disclosure of which is incorporated herein by reference for all purposes.

BACKGROUND

1. Field

The following description relates to an image processing method and apparatus.

2. Description of Related Art

Recently, electronic devices implementing technologies including, as examples, virtual reality (VR), augmented reality (AR), or mixed reality (MR) have been provided. Among such technologies, AR may be technology that combines and displays virtual objects or information associated with a real-world environment. AR may provide a new experience to a user by combining an external view with a virtual image and may be a method of delivering information more effectively and realistically.

Additionally, in view of developments of neural network technology in the field of image processing, it may be beneficial to provide AR by applying a neural network.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In a general aspect, a processor-implemented image processing method implementing a neural network includes generating appearance information corresponding to a standard space comprising a plurality of regular grids in a first input image by implementing a first neural network; generating geometric information corresponding to the standard space in a second input image by implementing a second neural network; deforming the plurality of regular grids based on the generated geometric information; generating standardized image information by applying the appearance information to the plurality of deformed regular grids; and generating an output image based on the standardized image information.

The standard space may be a canonical space which is defined by a cube comprising the plurality of regular grids.

The appearance information may include any one of feature information, color information, and texture information.

The geometric information may include any one of scale information, offset information, and depth information.

The deforming of the plurality of regular grids may include deforming coordinates corresponding to each of the plurality of regular grids based on scale information; and moving the deformed coordinates based on any one of offset information and depth information.

The standard space may include a space represented by a cube form comprising five faces that are based on a one-point perspective.

The first input image may be similar to the second input image.

The first input image may be different from the second input image.

The method may further include receiving viewpoint information, wherein the generating of the output image comprises generating an output image which corresponds to the received viewpoint information.

The generating of the output image corresponding to the viewpoint information may include generating the viewpoint information by applying a third input image to a fourth neural network; and generating an output image by applying the generated viewpoint information and image information corresponding to the first input image to a third neural network.

The neural network may include any one of the first neural network, the second neural network, and a third neural network which is trained to generate the output image.

The neural network may be configured to be trained to generate an image in which the first input image is deformed based on viewpoint information of a third input image.

The neural network may include a trained neural network configured to reduce a loss function, wherein the loss function may be determined based on a difference between a third input image and the output image which is generated by applying, to a third neural network, viewpoint information generated from the third input image by implementing a fourth neural network and image information corresponding to the first input image.

The second neural network may be configured to be trained based on any one of an offset normalization loss function and a depth normalization loss function.

The applying of the image information corresponding to the first input image to the third neural network may include converting the image information to a two-dimensional (2D) image; and applying the 2D image to the third neural network.

The generating of the output image may include generating first viewpoint information of a third input image; deforming the first viewpoint information of the third input image based on second viewpoint information; and generating the output image by applying image information and the deformed first viewpoint information to a third neural network.

The output image may include an image in which geometric information of the first input image is deformed based on one of geometric information of the second input image and an image in which appearance information of the first input image is deformed based on appearance information of the second input image.

The generating of the standardized image information may include generating the standardized image information based on the plurality of regular grids deformed based on geometric information of the first input image and appearance information of the second input image.

In a general aspect, an electronic device includes one or more processors, configured to: generate appearance information corresponding to a standard space defined by a cube comprising a plurality of regular grids in a first input image by implementing a first neural network; generate geometric information corresponding to the standard space in a second input image by implementing a second neural network; deform the plurality of regular grids based on the generated geometric information; generate standardized image information by applying the appearance information to the plurality of deformed regular grids; and generate an output image based on the standardized image information.

In a general aspect, an electronic device includes one or more processors, configured to: generate appearance information corresponding to a plurality of grids in a first standard space by applying an input image to a first neural network; generate geometric information corresponding to each of the plurality of grids by applying the input image to a second neural network; generating a second standard space by deforming coordinates corresponding to each of the plurality of grids based on the generated geometric information; generate standardized image information by applying the appearance information to the second standard space; convert the standardized information to a two-dimensional (2D) image, and apply the 2D image to a third neural network, and generate an output image by applying the 2D image to the third neural network.

The third neural network may be configured to be trained to generate the output image.

The standard space may include a space to align a deformable scene with a space of a single viewpoint.

Other features and aspects will be apparent from the following detailed description, the drawings, and the claims.

Throughout the drawings and the detailed description, unless otherwise described or provided, the same drawing reference numerals will be understood to refer to the same elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known, after an understanding of the disclosure of this application, may be omitted for increased clarity and conciseness, noting that omissions of features and their descriptions are also not intended to be admissions of their general knowledge.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

The terminology used herein is for the purpose of describing particular examples only, and is not to be used to limit the disclosure. As used herein, the singular forms "a," "an," and "the" are intended to include the plural forms as well, unless the context clearly indicates otherwise. As used herein, the term "and/or" includes any one and any combination of any two or more of the associated listed items. As used herein, the terms "include," "comprise," and "have" specify the presence of stated features, numbers, operations, elements, components, and/or combinations thereof, but do not preclude the presence or addition of one or more other features, numbers, operations, elements, components, and/or combinations thereof. The use of the term "may" herein with respect to an example or embodiment (for example, as to what an example or embodiment may include or implement) means that at least one example or embodiment exists where such a feature is included or implemented, while all examples are not limited thereto.

Although terms of "first" or "second" are used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

Throughout the specification, when an element, such as a layer, region, or substrate, is described as being "on," "connected to," or "coupled to" another element, it may be directly "on," "connected to," or "coupled to" the other element, or there may be one or more other elements intervening therebetween. In contrast, when an element is described as being "directly on," "directly connected to," or "directly coupled to" another element, there can be no other elements intervening therebetween. Likewise, expressions, for example, "between" and "immediately between" and "adjacent to" and "immediately adjacent to" may also be construed as described in the foregoing.

Unless otherwise defined, all terms, including technical and scientific terms, used herein have the same meaning as commonly understood by one of ordinary skill in the art to which this disclosure pertains consistent with and after an understanding of the present disclosure. Terms, such as those defined in commonly used dictionaries, are to be interpreted as having a meaning that is consistent with their meaning in the context of the relevant art and the present disclosure, and are not to be interpreted in an idealized or overly formal sense unless expressly so defined herein.

Also, in the description of example embodiments, detailed description of structures or functions that are thereby known after an understanding of the disclosure of the present application may be omitted when it is deemed that such description may cause ambiguous interpretation of the example embodiments. Hereinafter, examples will be described in detail with reference to the accompanying drawings, and like reference numerals in the drawings refer to like elements throughout.

Figure 1:
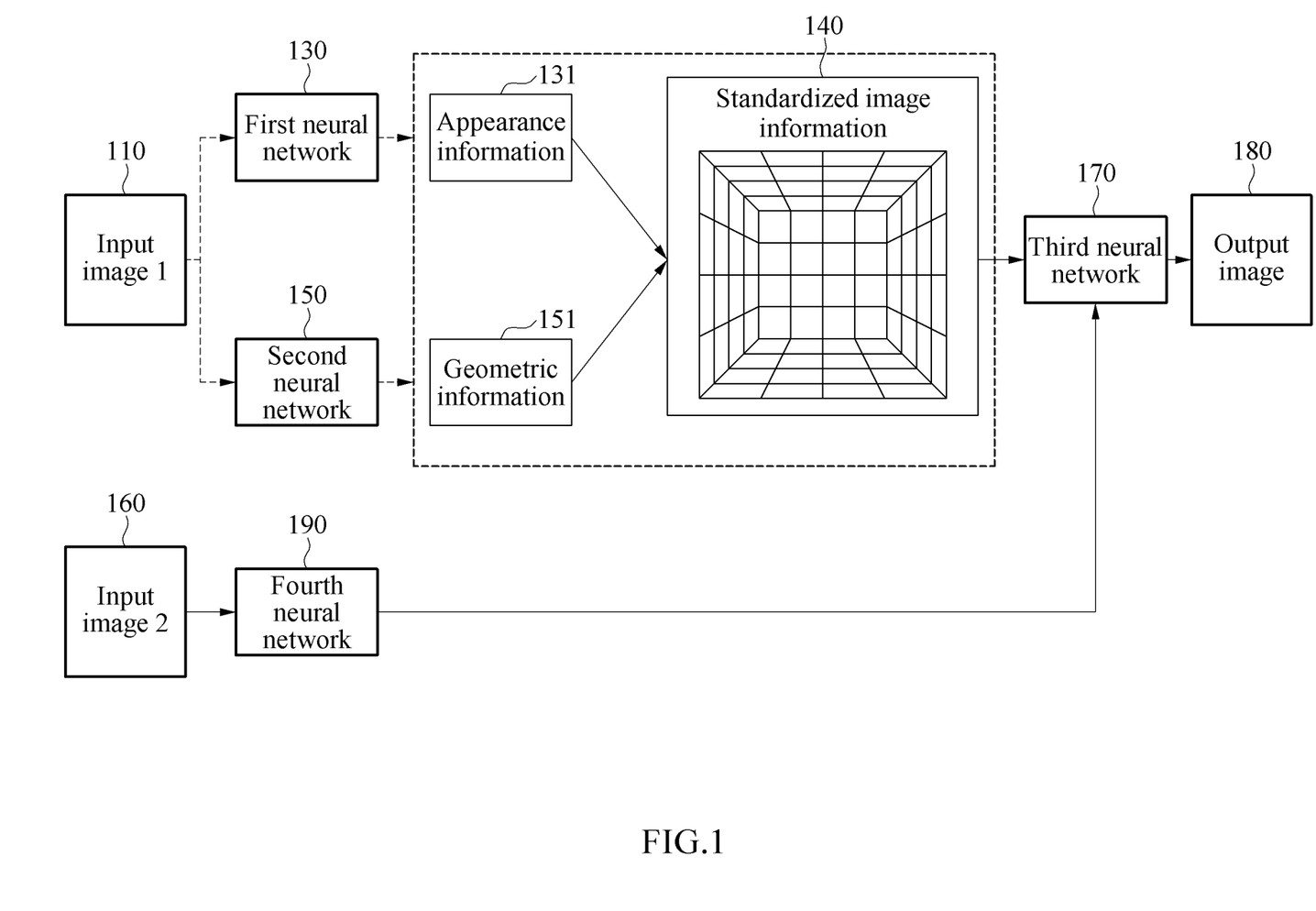
FIG. 1 illustrates an example method of generating an image, in accordance with one or more embodiments.

FIG. 1 illustrates an example method of generating an image, in accordance with one or more embodiments.

FIG. 1 illustrates an input image #1 110, an input image #2 160, a first neural network 130, a second neural network 150, appearance information 131, geometric information 151, standardized image information 140, a third neural network 170, an output image 180, and a fourth neural network 190.

In a non-limiting example, an input image #1 may be the same as an input image #2. In an example, the same input image may be applied to the first neural network 130 and the second neural network 150. In an example in which an input image #1 and an input image #2 are different, a description is provided hereinafter with reference to FIG. 6. In an example in which a third input image #3 is applied, the third input image may include an image applied to the fourth neural network 190. Herein, it is noted that use of the term 'may' with respect to an example or embodiment, e.g., as to what an example or embodiment may include or implement, means that at least one example or embodiment exists where such a feature is included or implemented while all examples and embodiments are not limited thereto.

Figure 8:
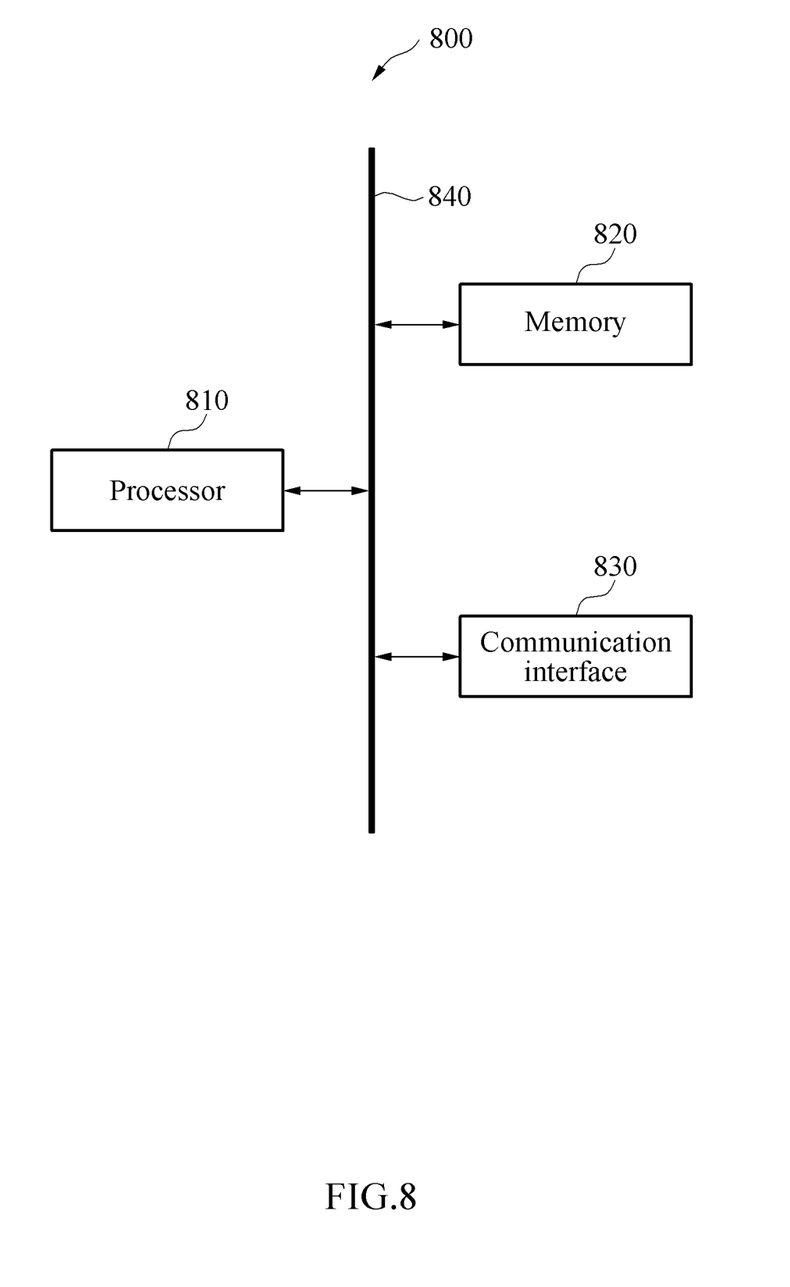
FIG. 8 illustrates an example electronic device, in accordance with one or more embodiments.

In an example, a processor 810 illustrated in FIG. 8 may generate the appearance information 131 by applying an input image #1 (e.g., the input image #1 110) to the first neural network 130. The processor 810 may generate the appearance information 131 corresponding to a standard space from the input image #1 110 by implementing the first neural network 130.

The standard space may include a space that aligns a deformable scene with a space of a single viewpoint. Variables in the standard space may be assumed to not be deformed in all environmental conditions and/or variations. The appearance information 131 and the geometric information 151 corresponding to the standard space may be each independent from deformation. The standard space may include a plurality of regular grids. In an example, the plurality of grids may each correspond to one pixel. In another example, a grid may include a plurality of pixels. A regular grid may include a grid having the same shape and/or size.

A cube may be generated based on a perspective view. The perspective view may include a view representing a perspective using a vanishing point on a horizon that becomes smaller as a distance increases. The cube may include a space represented in a form including five faces based on the one-point perspective view. The one-point perspective view may be a method of representing a perspective that is the same as the view from the viewer's eye and may include a projection diagram including only one vanishing point on the horizon. With respect to the direction facing the front, a cube may include a first side that is a face in the front, a second side that is a face on a left side, a third side that is a face on a right side, a fourth side that is a face on an upper side, and a fifth side that is a face that is on the lower side, and each side may include the plurality of regular grids. The cube is described in detail hereinafter with reference to FIG. 2.

A scene may include a plurality of objects (e.g., but not limited to, furniture, people, vehicles, trees, buildings, windows, home appliances, etc.). The input image may include the scene. The scene may be represented by the cube. The scene may be represented in a one-point perspective view including the plurality of regular grids. Therefore, the scene may be represented in a space represented by a perspective including the plurality of regular grids. The space represented by the perspective may be represented by five sides. Thus, the input image may be divided into five faces, and each side may include the plurality of regular grids.

The first neural network 130 may include a neural network that generates the appearance information 131. The first neural network 130 may include a plurality of convolutional layers and/or a plurality of pooling layers. In an example, the first neural network 130 may include, as only examples, a generative adversarial network (GAN), a large-scale GAN, a residual neural network (ResNet) and/or very deep convolutional networks (VGGNet). The first neural network 130 described above is only an example and is not limited thereto.

The appearance information 131 may include information associated with features visually recognizable in the image. The appearance information 131 may include information associated with an appearance of content included in the image. The appearance information 131 may include any one of feature information, color information, and texture information.

The feature information may include feature information of a set grid. For example, the feature information may include a value calculated through a convolutional operation for a pixel value.

The color information may include color information of a set grid. For example, the color information may include information associated with a color of the set grid. In another example, the color information may include unique color information of a material irrespective of a viewpoint or lighting as a material component of an object. The color information may be generated based on the feature information. The processor 810 may generate the color information by applying the feature information to a neural network that generates the color information. The processor 810 may generate the color information by implementing the first neural network 130, and the color information may not necessarily be generated using the feature information.

The texture information may include information applied to a surface for visual details. Texture may include a visual representation of the texture. The texture information may be generated based on the feature information. The processor may generate the texture information by applying the feature information to a neural network that generates the texture information. The processor 810 may generate the texture information by implementing the first neural network 130, and the texture information may not necessarily be generated using the feature information.

Appearance information corresponding to the standard space may include appearance information when the scene is deformed into a standard space to be a standard. For example, the appearance information corresponding to the standard space may include visual information unique to a material irrespective of the viewpoint or lighting. Feature information in the standard space may include feature information when the scene is deformed into a standard space to be the standard. Color information in the standard space may include color information when the scene is deformed into the standard space to be the standard. Texture information in the standard space may include texture information when the scene is deformed into the standard space to be the standard.

The processor 810 may generate the geometric information 151 by applying the input image #1 110 to the second neural network 150. The processor 810 may generate the geometric information 151 corresponding to each of the plurality of regular grids in the standard space from the input image #1 110 by implementing the second neural network 150.

The second neural network 150 may include, as non-limited examples, a neural network that generates geometric information. The second neural network 150 may include a plurality of convolutional layers and/or a plurality of pooling layers. In an example, the second neural network 150 may include a U-net (or convolutional networks for biometric image segmentation). The second neural network 150 described above is only an example and is not limited thereto.

The geometric information 151 may include feature information of a space associated with a distance, a shape, a size and/or a relative position. The geometric information 151 may include any one of scale information, offset information and depth information.

The scale information may include information to adjust the size of the scene to deform the input image (or the scene) to the standard space to be the standard. In an example, an object A in the standard space and the same object A in the scene may vary in size based on a time of day. Therefore, it may be beneficial to resize the input image to convert the size of the object present in the scene into the size of the object present in the standard space. Thus, the processor 810 may convert the scene into the standard space using the scale information.

The offset information may include information to move one position (e.g., a position of a pixel, a position of a point in the grid, etc.) of the scene to deform the scene to a standard space to be the standard. In an example, even for the same object in the standard space and the scene, a position may be different in the coordinate system based on the time of day. Therefore, it may be beneficial to adjust the position of the object to convert the object present in the scene into the object present in the standard space. The processor 810 may move one position (or coordinates) of the scene to the standard space based on the offset information.

The depth information may include information associated with a depth of a set pixel of a two-dimensional (2D) image to obtain three-dimensional (3D) spatial information from the 2D image. In an example, the depth information may be represented as a depth value at x and y coordinates. In another example, the depth information may include information that defines a point cloud of the object depicted on a 2D regular grid.

The geometric information 151 corresponding to the standard space may include geometric information when the scene is deformed into a standard space to be the standard. The geometric information corresponding to the standard space may include a geometric change. The geometric information corresponding to the standard space may include a scale change amount when the scene is deformed into the standard space to be the standard. Offset information in the standard space may include the amount of change in position of the grid (or pixels) when the scene is deformed into a standard space to be the basis. Depth information in the standard space may include depth information when the scene is deformed into a standard space to be the standard.

The processor 810 may generate the standardized image information 140 based on the appearance information 131 and the geometric information 151. The standardized image information 140 may include image information generated based on the geometric information 151 to align the input image with the standard space. Therefore, the standardized image information 140 may include information associated with a prediction space aligned with the standard space, on which the input image is the standard.

The processor 810 may deform each of the plurality of regular grids based on the geometric information 151.

The processor 810 may generate the standardized image information 140. The processor 810 may change the size of the plurality of regular grids in the first standard space based on the scale information, and thereby generate a second standard space. The processor 810 may deform the coordinates corresponding to each of the plurality of regular grids in the standard space based on the scale information. For example, the grid coordinates in the standard space may be (x, y, z), and the scale information may be $(s_x, s_y, s_z)$. In an example, the processor 810 may multiply the scale information by the coordinates. Therefore, the deformed coordinates may be $(s_x x, s_y y, s_z z)$.

The processor 810 may move the deformed coordinates (e.g., $s_x x, s_y y, s_z z$) based on any one of the offset information and the depth information.

The processor 810 may move the deformed coordinates using the offset information. For example, the processor 810 may add an offset to the deformed coordinates using the offset information $(\Delta x, \Delta y, \Delta z)$. In an example, the moved coordinates may be $(s_x x + \Delta x, s_y y + \Delta y, s_z z + \Delta z)$.

The processor 810 may move the deformed coordinates based on the depth information. In an example, the depth information may correspond to a z-axis in a spatial coordinate system. In an example, when the depth information corresponding to a set regular grid is d, the deformed coordinates based on the depth information may be $(s_x x, s_y y, s_d d)$.

The processor 810 may move the deformed coordinates based on the offset information and the depth information. For example, the depth information may be d, and the offset information may be $(\Delta x, \Delta y)$. In an example, the deformed coordinates may be $(s_x x + \Delta x, s_y y + \Delta y, s_z d)$.

The processor 810 may generate standardized image information 140 by applying the appearance information 131 to the plurality of deformed regular grids.

In an example, the processor 810 may generate an output image based on the standardized image information. The processor 810 may generate the output image by applying standardized image information 140 to the third neural network 170. The third neural network 170 may include a neural network trained to generate the output image. The third neural network 170 may include a neural network trained to reconstruct the image. For example, the third neural network 170 may include a GAN.

The processor 810 may convert the image information to the 2D image. The processor 810 may generate the 2D image by projecting the image information in 2D. Since the image information may include 3D spatial information, the processor may project the image information in 2D. The processor 810 may apply the 2D image to the third neural network 170. The processor 810 may generate the output image 180 by applying the 2D image to the third neural network 170.

The processor 810 may receive viewpoint information. The viewpoint information may include information determined based on a difference between a viewpoint in the standard space and a viewpoint in the input image (or the scene). In an example, a viewpoint of the input image may include a time point rotated 30 degrees(°) in an x-axis direction from the viewpoint in the standard space. The processor 810 may generate the output image 180 deformed to the point in time of deforming the input image based on the viewpoint information. The processor 810 may generate the viewpoint information by applying the input image #2 160 (or a third input image) to the fourth neural network 190.

The processor 810 may generate the output image 180 corresponding to the viewpoint information. In an example, time point information and the standardized image information 140 may be generated by implementing the fourth neural network 190. The processor 810 may generate the output image 180 by applying the time point information and the standardized image information 140 generated by implementing the fourth neural network 190 to the third neural network 170.

The output image 180 may include an image that is deformed from the input image #1 110 into the viewpoint information of the input image #2 160. In an example, the viewpoint of the input image #1 110 and the viewpoint of the input image #2 160 may vary by 30° in the x-axis direction. In an example, the processor 810 may generate an output image 180 when the input image #1 110 is viewed at the time of a 30° rotation in the x-axis direction.

When the viewpoint is deformed, other information not included in the input image may be beneficial. In an example, when the viewpoint is deformed, the scene may be deformed, and thus the object present in the background or scene may be deformed. Thus, the processor 810 may generate the image information that is not included in the input image due to a viewpoint deformation through the third neural network 170 such that an empty area is not present in the output image.

In a non-limiting example, a first input image 110 and a second input image 160 may be different images. When the first input image 110 and the second input image 160 are different, the geometric information of the first input image 110 may be deformed into the geometric information of the second input image 160. Additionally, the appearance information of the first input image 110 may be deformed into the appearance information of the second input image 160. An example of deforming the appearance information and/or the geometric information of the first input image 110 based on the second input image 160 is described in detail with reference to FIG. 6.

Figure 2:
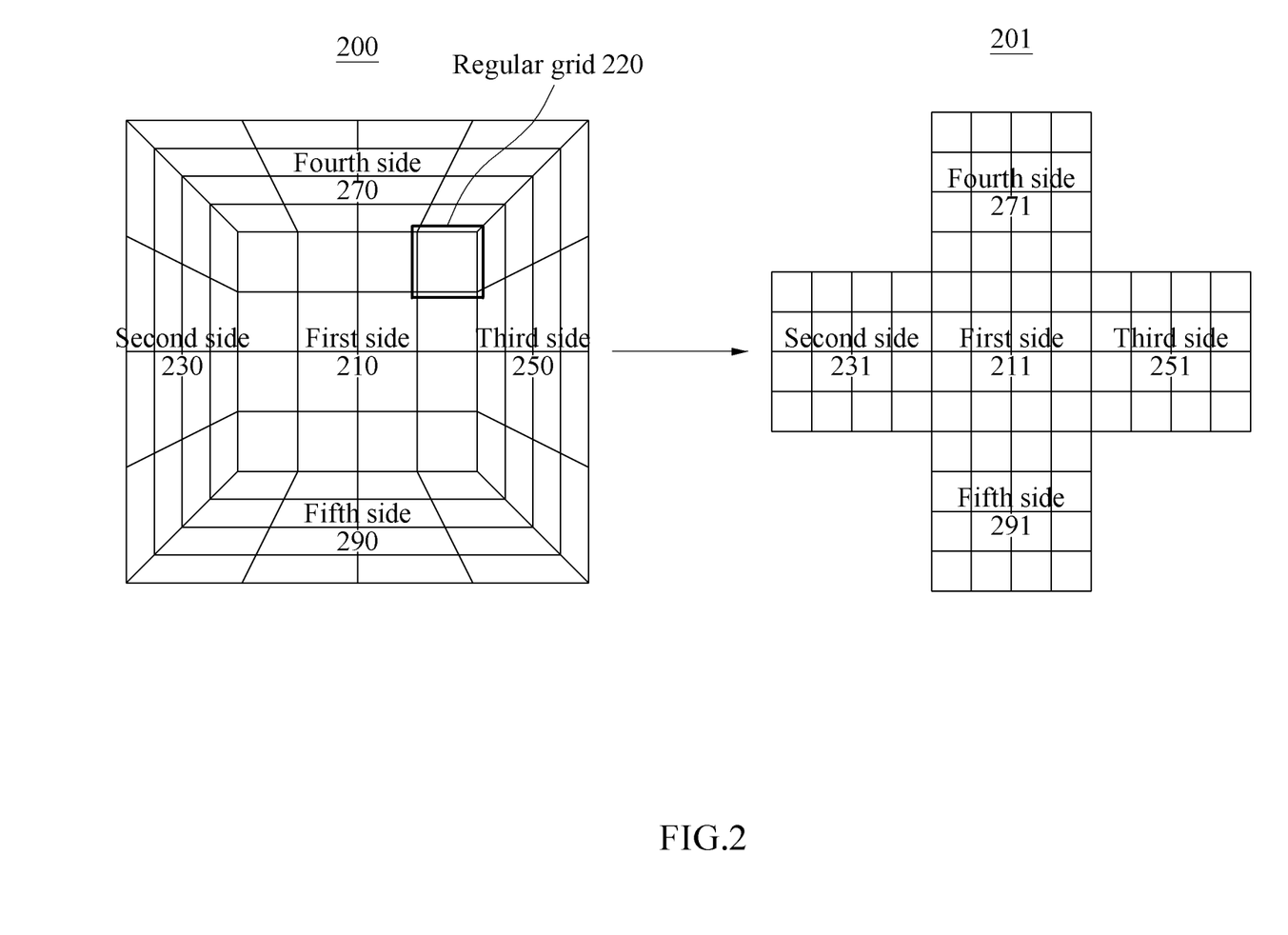
FIG. 2 illustrates an example standard space, in accordance with one or more embodiments.

FIG. 2 illustrates an example standard space, in accordance with one or more embodiments.

FIG. 2 illustrates a cube 200, a diagram 201, and a plurality of faces (or sides) 210, 211, 230, 231, 250, 251, 270, 271, 290, and 291.

The standard space may include a space to align a deformable scene with a space of a single viewpoint. Variables in the standard space are assumed to not be deformed in all environmental conditions and/or variations.

The standard space may include a plurality of regular grids. In an example, the plurality of grids may each correspond to one pixel. A regular grid may include a grid having the same shape and/or size.

The cube 200 may be generated based on a perspective view. The perspective view may include a view representing a perspective using a vanishing point on a horizon that becomes smaller as a distance increases. The cube 200 may include a space represented in a form including five faces based on a one-point perspective view. The one-point perspective view may be a method of representing a perspective that is the same as the view from the viewer's eye and may include a projection diagram including only one vanishing point on the horizon.

With respect to the direction facing the front, the cube 200 may include a first side 210 that is a face of the cube 200 in the front, a second side 230 that is a face on a left side of the cube 200, a third side 250 that is a face on a right side of the cube 200, a fourth side 270 that is on an upper side of the cube 200, and a fifth side 290 that is a face that is on the lower side of the cube 200, and each side may include the plurality of regular grids.

When each side of the cube 200 is unfolded, five sides may be unfolded. The diagram 201 illustrates an example of unfolding the five sides of the cube, that is, the first side 211, the second side 231, the third side 251, the fourth side 271 and the fifth side 291. Each side of the diagram 201 may correspond to the respective sides of the cube 200. Each side of the diagram 201 may include the plurality of regular grids, and the plurality of regular grids may each correspond to one pixel. In an example, there may be a plurality of pixels in the regular grid.

A scene may include a plurality of objects (e.g., furniture, people, vehicles, trees, buildings, windows, home appliances, etc.). In an example, the scene may include an indoor scene and/or an outdoor scene. The input image may include the scene. The scene may be represented as a cube. The scene may be represented in a one-point perspective view including the plurality of regular grids. Therefore, the scene may be represented in a space represented by a perspective including the plurality of regular grids. The space represented by the perspective may be represented by five sides. Therefore, the input image may be divided into five faces, and each side may include the plurality of regular grids.

The processor 810 may deform the scene into various forms of the input image including the scene by defining the scene as a standard space in a cube form.

Figure 3:
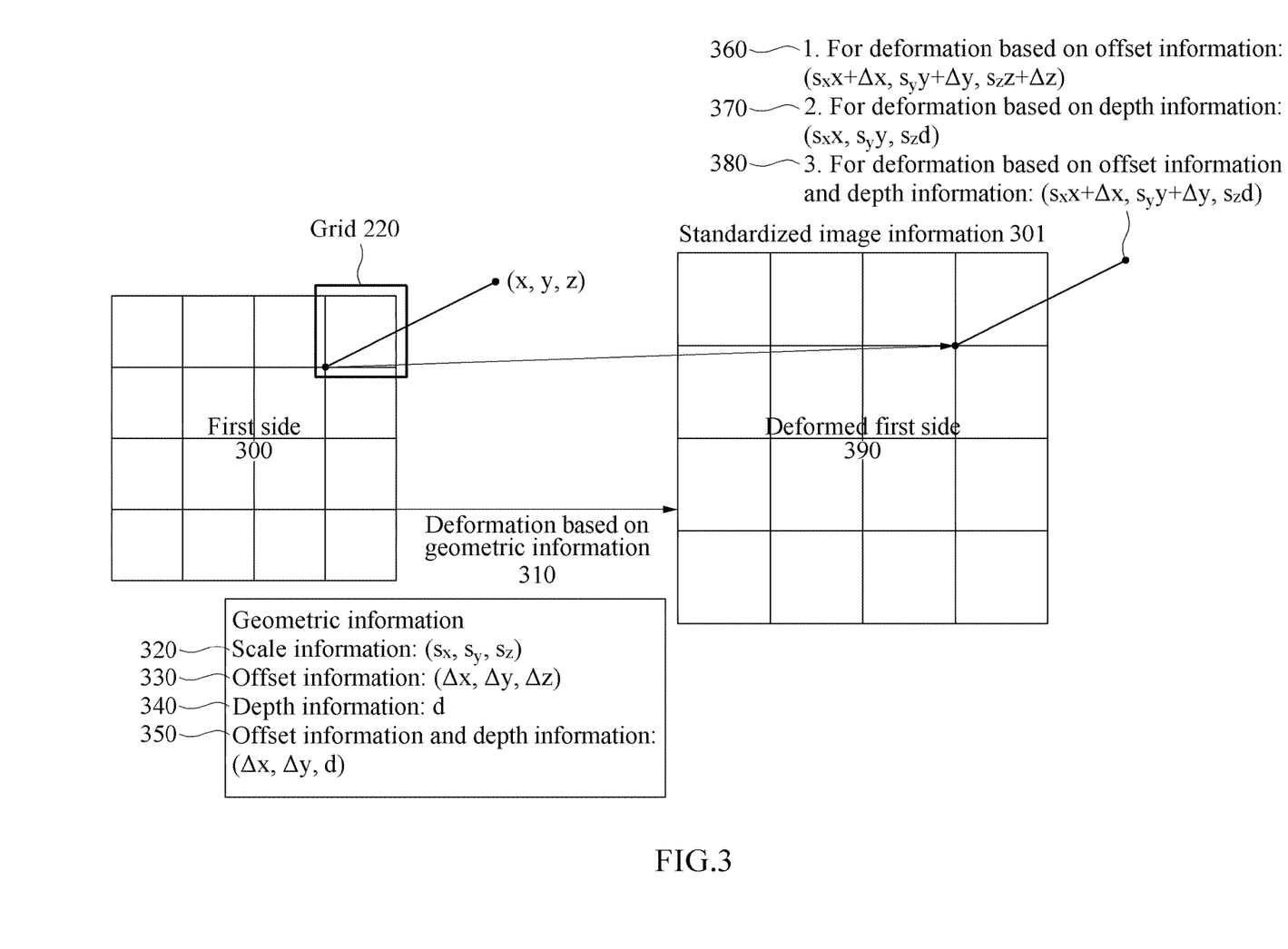
FIG. 3 illustrates an example method of deforming regular grids, in accordance with one or more embodiments.

FIG. 3 illustrates an example method of deforming regular grids, in accordance with one or more embodiments.

FIG. 3 illustrates a first side 300, a regular grid 220, sets of geometric information, for example, scale information 320, offset information 330, depth information 340, and offset and depth information 350, standardized image information 301, a deformed first side 390, coordinates 360 in an example of deformation based on offset information, coordinates 370 in an example of deformation based on depth information, coordinates 380 in an example of deformation based on offset information and depth information.

The processor 810 may generate the standardized image information 301. The processor 810 may deform a size of the plurality of regular grids in a standard space based on the scale information 320. The processor 810 may deform the coordinates corresponding to each of the plurality of regular grids into the standard space based on the scale information 320. In an example, the regular grid 220 in the first side 300 may be one-point coordinates (x, y, z), and the scale information 320 may be $(s_x, s_y, s_z)$. In an example, the processor 810 may multiply the scale information 320 by the one-point coordinates (x, y, z) in the regular grid 220. Therefore, the deformed coordinates can be $(s_x x, s_y y, s_z z)$.

The processor 810 may move the deformed coordinates (e.g., $(s_x x, s_y y, s_z z)$) based on any one of the offset information and the depth information.

The processor 810 may move the deformed coordinates based on the offset information 330. In an example, the processor 810 may add an offset to the deformed coordinates based on the offset information 330 $(\Delta x, \Delta y, \Delta z)$. In an example, the coordinates 360, which are deformed based on the offset information, may be $(s_x x+\Delta x, s_y y+\Delta y, s_z z+\Delta z)$.

The processor 810 may move the deformed coordinates using the depth information 340. In an example, the depth information 340 may correspond to a z-axis in a spatial coordinate system. In an example, when depth information corresponding to the regular grid 220 is d, the coordinates 370 in an example of deformation based on the depth information may be ($s_x x$, $s_y y$, $s_z d$).

The processor 810 may move the deformed coordinates based on the offset information and depth information 350. In an example, the depth information is d, and the offset information may be ($\Delta x$, $\Delta y$). In an example, the coordinates 380 in an example of transformation based on offset information and depth information may be ($s_x x+\Delta x$, $s_y y+\Delta y$, $s_z d$).

Figure 4:
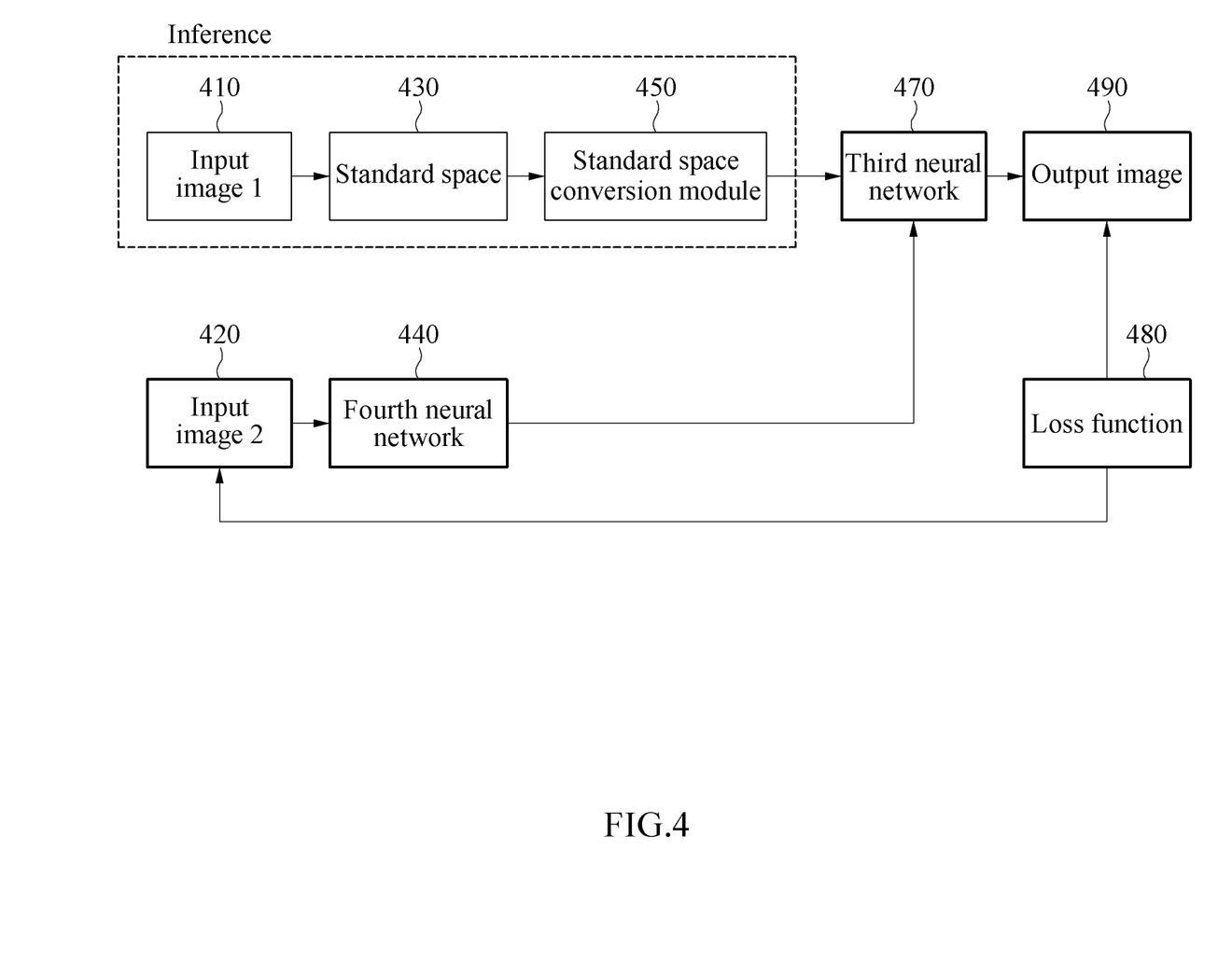
FIG. 4 illustrates an example method of training a neural network, in accordance with one or more embodiments.

FIG. 4 illustrates an example method of training a neural network, in accordance with one or more embodiments.

FIG. 4 illustrates a first input image #1 410, a standard space 430, a standard space conversion module or device 450, a third neural network 470, an output image 490, a second input image #2 420, a fourth neural network 440, and a loss function 480.

In an example, a neural network may include any one of a first neural network, a second neural network, and the third neural network 470. The neural network may include the first neural network, the second neural network and the third neural network 470 in an inference process. In another example, a neural network may include a first neural network, a second neural network, a third neural network, and the fourth neural network 440 in a learning (or training) process. Thus, the fourth neural network 440 may also be trained together in the learning process.

The neural network may include a neural network trained to generate an image in which the input image #1 410 is deformed based on viewpoint information of the input image #2 420. The processor 810 may generate the viewpoint information of the input image #2 420 by implementing the fourth neural network 440. Each of the input image #1 410 and the input image #2 420 may be frames included in a video. In an example, when the input image #1 410 is frame #1, the input image #2 420 may be frame #2, which is the next frame of the frame #1.

The neural network may include, for example, a neural network that is trained based on a loss function. The neural network may update parameters of the neural network in a direction of reducing the loss function. The loss function may be determined based on a difference between ground truth data and output data of the neural network. The processor may update the parameters of the neural network in the direction of reducing the loss function.

The loss function 480 may be determined based on the difference between an output image 490 and the input image #2 420. The loss function 480 may be determined based on the difference between the output image 490 and the input image #2 420 generated by applying viewpoint information generated using the fourth neural network 440 from the input image #2 420 and image information corresponding to the input image #1 410 to the third neural network 470. In a non-limited example, the input image #2 420 may be ground truth data. Thus, the processor 810 may allow the neural network to perform self-supervised learning.

The processor 810 may represent the input image #1 410 as a standard space defined by a cube in a neural network learning process. The processor 810 may convert the standard space to standardized image information by implementing the standard space conversion module 450. The processor 810 may be apply viewpoint information corresponding to the standardized image information and the input image #2 420 to the third neural network 470. The standard space conversion module or device 450 may include a module or device that deforms a plurality of regular grids based on geometric information. The processor 810 may generate the output image 490 by implementing the third neural network 470. The processor 810 may calculate the loss function 480 based on a difference between the output image 490 and the input image #2 420. The processor 810 may update the parameters of the neural network based on the loss function 480 in the direction in which the loss function 480 is reduced.

The neural network, (for example, a first neural network, a second neural network, and the third neural network 470), may be trained based on any one of an offset normalization loss function and a depth normalization loss function. The offset normalization loss function may include a loss function for training the neural network, (for example, a first neural network, a second neural network, and the third neural network 470), such that output offset information is not overfitting. The offset normalization loss function may include a loss function to train the neural network (or a second neural network) such that a sum of offset values of each axis $\Sigma(\Delta x2+\Delta y2+\Delta z2)$ is minimized. Therefore, the processor 810 may update the parameters of the neural network (or a second neural network) in the direction in which the offset normalization loss function is minimized. As such, the processor 810 may obtain standardized image information even for the same scene or a distorted scene from various viewpoints.

The depth normalization loss function may include a loss function to ensure that the output depth information is not overfitting. The depth normalization loss function may include a loss function to train the neural network (or a second neural network) such that the output depth information is not overfitting. The depth normalization loss function may learn the loss function to minimize $\Sigma(d-1)^2$. Therefore, the processor 810 may update the parameters of the neural network (or a second neural network) in the direction of minimizing the depth normalization loss function. As such, the processor 810 may obtain standardized image information even for the same scene or a distorted scene from various viewpoints $\Sigma(d-1)^2$ 1 and may include the depth information in which 1 is a standard. Therefore, when d becomes closer to 1, a probability of generating standardized image information may increase.

The neural network may include any one of an offset normalization layer and a depth normalization layer. The second neural network may include any one of the offset normalization layer and the depth normalization layer. A normalization layer may include a layer that solves an overfitting issue of the neural network and increasing learnability of the neural network.

The offset normalization layer may include a layer that trains the neural network such that the output offset information is not overfitting when the output data of the second neural network is offset information. In an example, the processor 810 may use $\Sigma(\Delta x2+\Delta y2+\Delta z2)$, which is a sum of offset values of each axis for offset normalization. As such, the processor 810 may reduce a probability of generating an offset value that is extremely larger or smaller than the normal offset value through a second neural network.

The depth normalization layer may include a layer that ensures that the output depth information is not overfitting when the output data of the second neural network is depth information. In an example, the processor may normalize the depth information using $\Sigma(d-1)^2$. As such, the processor may reduce the probability of generating a depth value that is extremely greater or less than the normal depth value through a second neural network.

Figure 5:
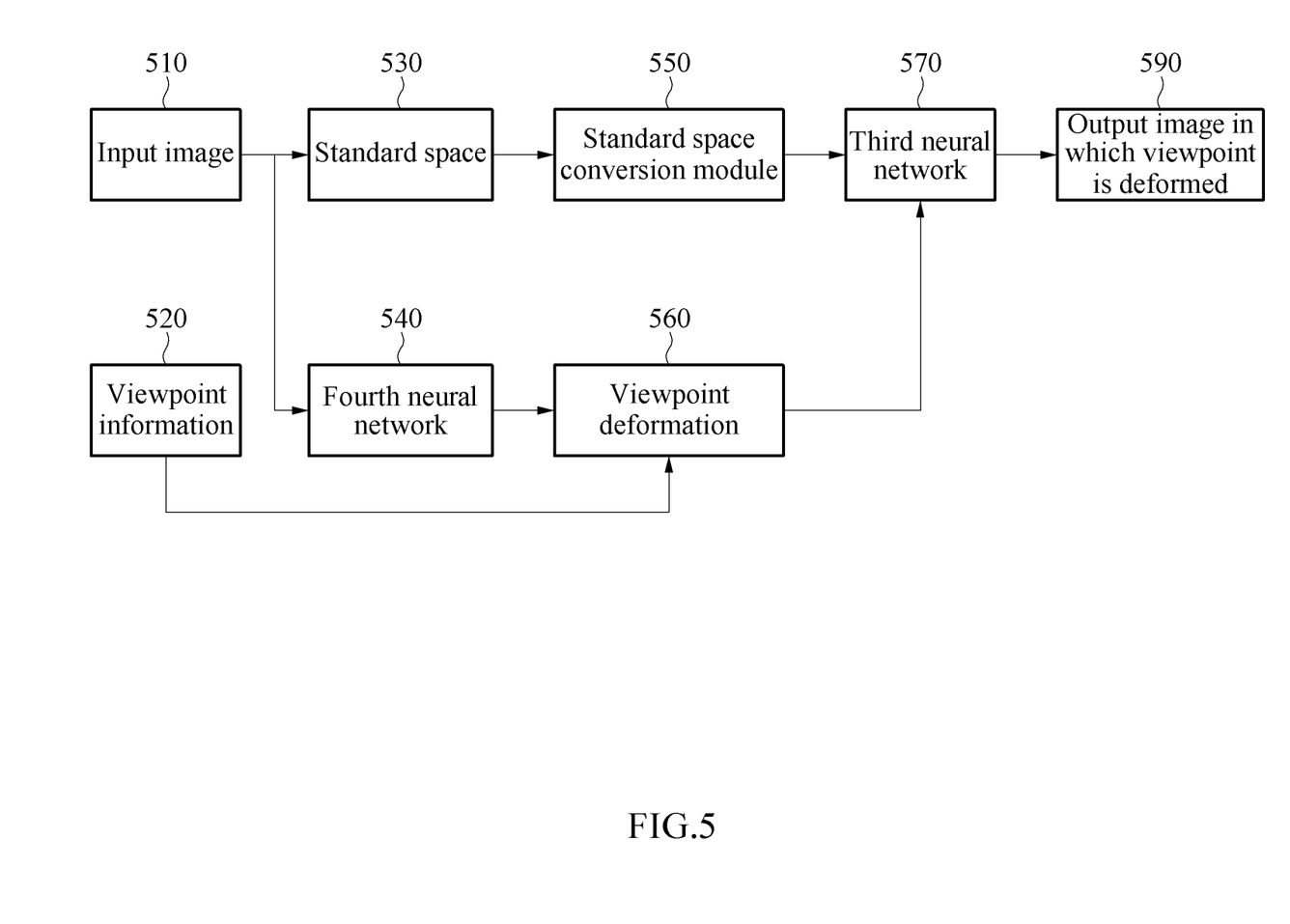
FIG. 5 illustrates an example method of processing an image in which viewpoint information is converted, in accordance with one or more embodiments.

FIG. 5 illustrates an example method of processing an image in which viewpoint information is converted, in accordance with one or more embodiments.

Referring to FIG. 5, an input image 510, a standard space 530, a standard space conversion module or device 550, a third neural network 570, an output image 590 in which a viewpoint is deformed, viewpoint information 520, a fourth neural network 540, and viewpoint deformation 560 are illustrated.

It may be desirable to convert an input image to an image of a desired viewpoint. In an example, when a screen displayed through a wearable device that the user is wearing changes, it may be desirable that the changed screen is aligned in a direction in which the user is viewing. Therefore, the processor 810 may convert an input image of the desired viewpoint (e.g., a viewpoint in a direction in which the user is currently viewing) by implementing a neural network.

The processor 810 may represent the input image 510 as the standard space 530 and may generate standardized image information based on the standard space conversion module or device 550.

The processor 810 may provide an input image 510 to the fourth neural network 540. The processor 810 may generate the viewpoint information of the input image 510 by implementing the fourth neural network 540.

The processor 810 may receive viewpoint information 520. In an example, the viewpoint information 520 may include target viewpoint information to be changed. The processor 810 may perform viewpoint deformation 560 based on the viewpoint information 520 at which viewpoint information of the input image 510 is received.

The processor 810 may generate the output image 590, in which a viewpoint is deformed, by applying the deformed viewpoint information and the standardized image information to the third neural network 570. The output image 590, in which the viewpoint is deformed, may include an output image in which the viewpoint is deformed based on the viewpoint information 520.

Figure 6:
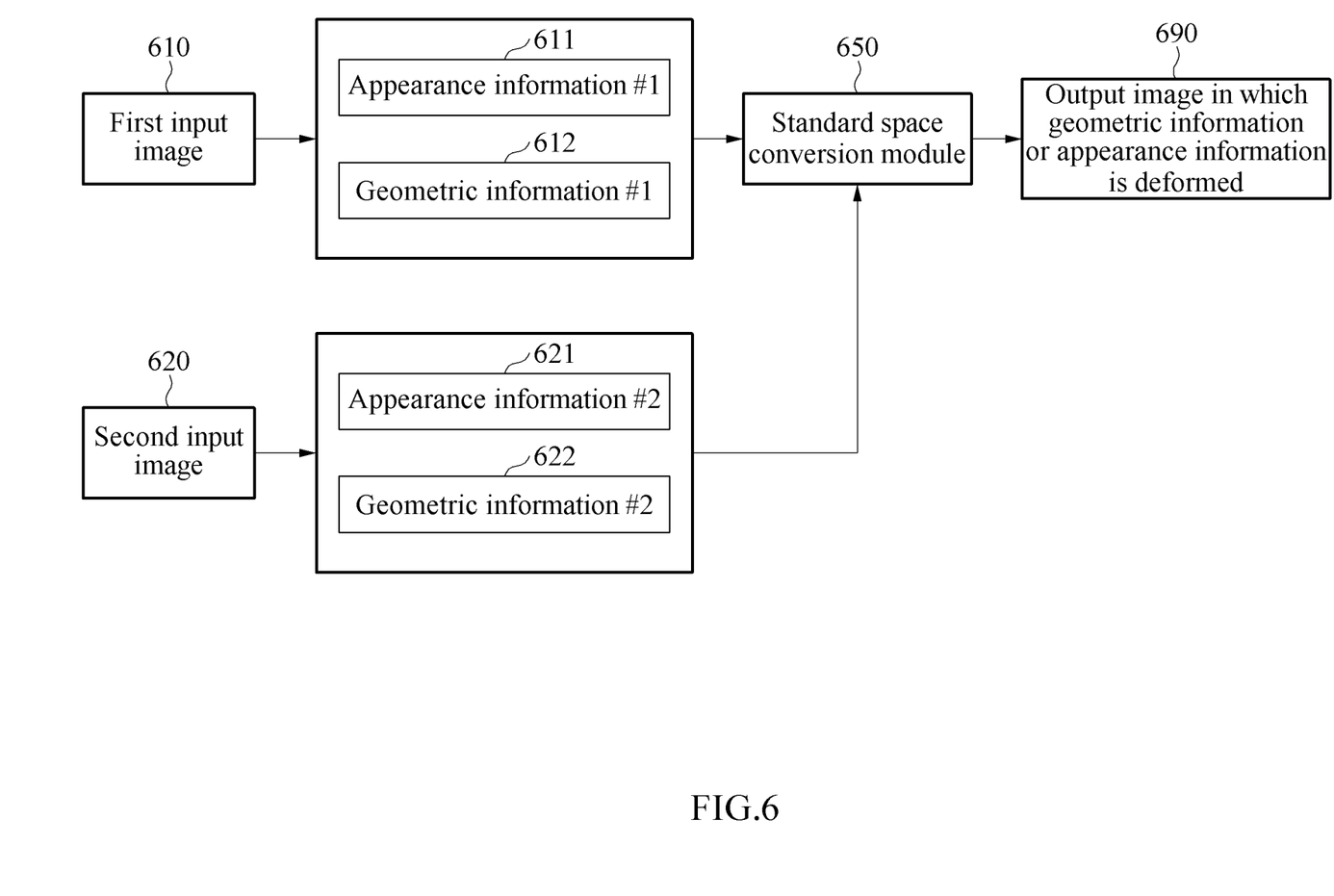
FIG. 6 illustrates an example method of processing an image in which appearance information or geometric information is converted, in accordance with one or more embodiments.

FIG. 6 illustrates an example method of processing an image in which appearance information or geometric information is converted, in accordance with one or more embodiments.

Referring to FIG. 6, a first input image 610, a second input image 620, appearance information #1 611, geometric information #1 612, appearance information #2 621, geometric information #2 622, a standard space conversion module or device 650, and an output image 690 in which geometric information or appearance information is deformed, are illustrated.

In an example, geometric information of the first input image 610 may be deformed into geometric information of the second input image 620, which may be a different image from the first input image 610. In an example, appearance information of the first input image 610 may be changed to appearance information of the second input image 620. The processor 810 may generate an image that has changed the appearance information or the geometric information of the first input image 610.

The processor 810 may generate the appearance information #1 611 by applying the first input image 610 to the first neural network 130. The processor 810 may generate the geometric information #2 622 by applying the second input image 620 to the second neural network 150. The processor may deform the plurality of regular grids based on the geometric information #2 622 of the second input image 620. The processor 810 may deform the plurality of regular grids based on the standard space conversion module or device 650, and may generate standardized image information by applying the appearance information #1 611 of the first input image 610 to a plurality of deformed regular grids. Therefore, the standardized image information may include image information generated based the appearance information #1 611 of the first input image 610 and the geometric information #2 622 of the second input image 620. The processor 810 may generate the output image 690, in which geometric information of the first input image 610 is deformed, by applying corresponding image information to a third neural network.

The processor 810 may generate the geometric information #1 612 by applying the first input image 610 to the second neural network 150. The processor 810 may generate the appearance information #2 621 by applying the second input image 620 to the first neural network 130. The processor 810 may deform the plurality of regular grids based on the geometric information #1 612 of the first input image 610. The processor 810 may deform the plurality of regular grids using the standard space conversion module 650, and may generate standardized image information by applying the appearance information #2 621 of the second input image 620 to the plurality of deformed regular grids. Therefore, the standardized image information may include image information generated based on the geometric information #1 612 of the first input image 610 and the appearance information #2 621 of the second input image 620. The processor 810 may generate the output image 690, in which appearance information of the first input image 610 is deformed, by applying corresponding image information to a third neural network.

Figure 7:
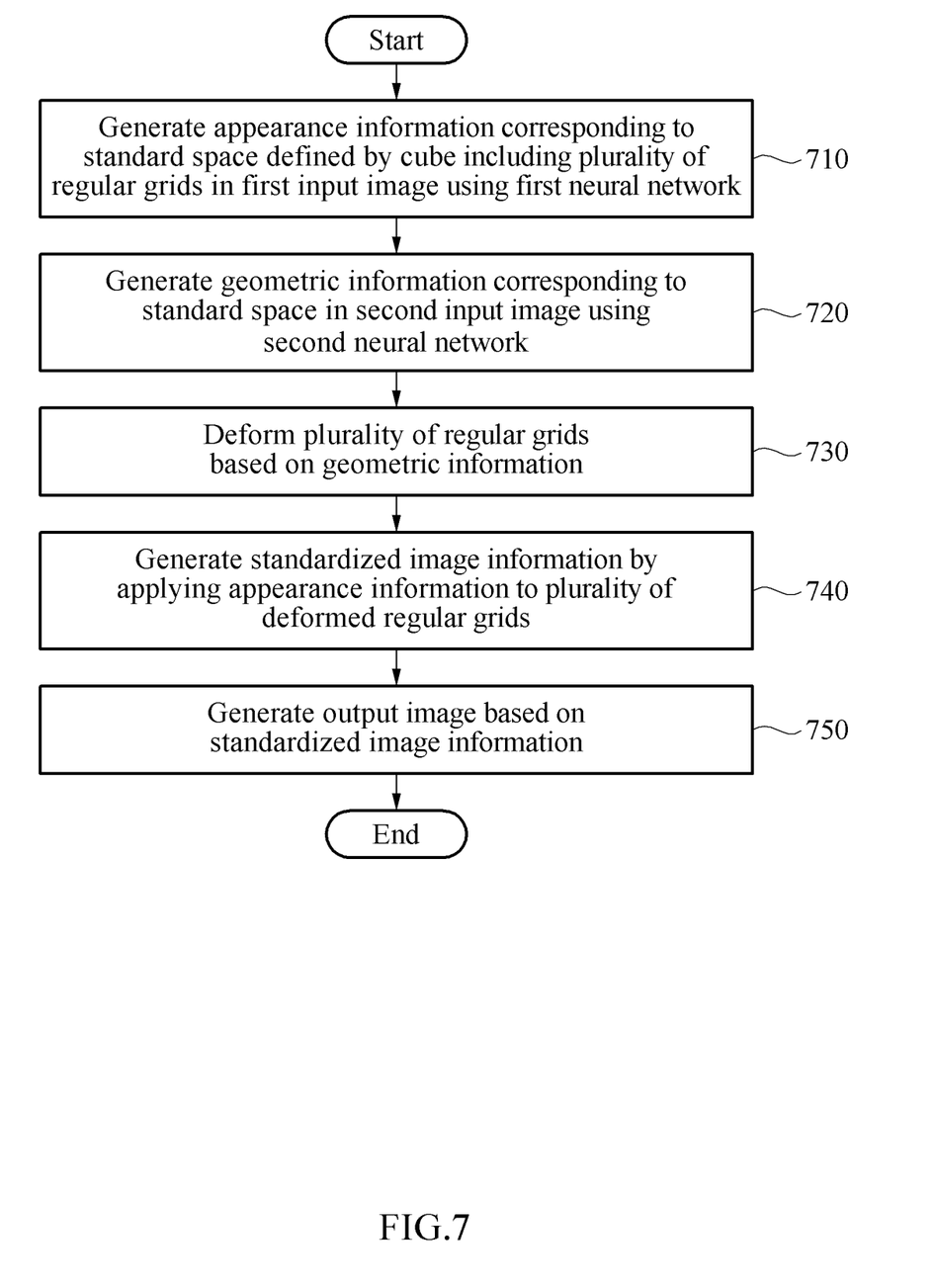
FIG. 7 illustrates an example method of generating an image, in accordance with one or more embodiments.

FIG. 7 illustrates an example method of generating an image, in accordance with one or more embodiments. The operations in FIG. 7 may be performed in the sequence and manner as shown, although the order of some operations may be changed or some of the operations omitted without departing from the spirit and scope of the illustrative examples described. Many of the operations shown in FIG. 7 may be performed in parallel or concurrently. One or more blocks of FIG. 7, and combinations of the blocks, can be implemented by special purpose hardware-based computer that perform the specified functions, or combinations of special purpose hardware and computer instructions. In addition to the description of FIG. 7 below, the descriptions of FIGS. 1-6 are also applicable to FIG. 7, and are incorporated herein by reference. Thus, the above description may not be repeated here.

In operation 710, an electronic device, for example, electronic device 800, FIG. 8, may generate appearance information corresponding to a standard space defined by a cube including a plurality of regular grids from a first input image by implementing a first neural network.

The appearance information may include any one of, but not limited to, feature information, color information, and texture information.

In operation 720, the electronic device 800 may generate geometric information corresponding to the standard space from a second input image by implementing a second neural network.

The geometric information may include scale information and any one of offset information and depth information.

In operation 730, the electronic device 800 may deform the plurality of regular grids based on the geometric information.

The electronic device 800 may deform coordinates corresponding to each of the plurality of regular grids based on the scale information. The electronic device 800 may move the deformed coordinates based on any one of the offset information and the depth information.

In operation 740, the electronic device 800 may generate the standardized image information by applying the appearance information to the plurality of deformed regular grids.

In operation 750, the electronic device 800 may generate the output image based on the standardized image information.

The electronic device 800 may convert the image information to a 2D image, and apply the 2D image to a third neural network.

The electronic device 800 may generate first viewpoint information of an input image, and deform the viewpoint information based on second viewpoint information. The electronic device 800 may generate an output image by applying the image information and the deformed first viewpoint information to the third neural network.

The electronic device 800 may generate the plurality of deformed regular grids based on the geometric information of the first input image and the standardized image information based on the appearance information of the second input image.

The electronic device 800 may receive the viewpoint information, and generate the output image corresponding to the viewpoint information.

The electronic device 800 may generate the viewpoint information by applying a third input image to a fourth neural network. The electronic device 800 may generate the output image by applying image information corresponding to the viewpoint information and a first input image to the third neural network. The third input image may be an input image being applied to the fourth neural network, and may include the same image as the first image, or may apply a different image than the first input image and/or the second input image.

FIG. 8 illustrates an example electronic device 800, in accordance with one or more embodiments.

Referring to FIG. 8, the electronic device 800 may include one or more processors 810, one or more memories 820, and a communication interface 830. The memory 820, the processor 810, and the communication interface 830 may be connected to each other through a communication bus 840.

The memory 820 may store a variety of information generated in a processing process of the processor 810 described above. Additionally, the memory 820 may store a variety of data and programs. The memory 820 may include a volatile memory or a non-volatile memory. The memory 820 may include a large-capacity storage medium such as a hard disk to store the variety of data.

The processor 810 may be a hardware-implemented apparatus having a circuit that is physically structured to execute desired operations. In an example, the desired operations may include instructions or code in a program. The hardware-implemented apparatus may include, but is not limited to, for example, a microprocessor, a central processing unit (CPU), a graphics processing unit (GPU), a processor core, a multi-core processor, a multiprocessor, an application-specific integrated circuit (ASIC), a field-programmable gate array (FPGA), and a neural processing unit (NPU).

The processor 810 may execute a program and control the electronic device 800. The code of the program executed by the processor 810 may be stored in the memory 820.

A neural network may output a value calculated by internal parameters in response to the input data. Here, at least a portion of the neural network may be implemented as software, hardware including a neural processor, or a combination thereof. For example, the neural network may correspond to a deep neural network (DNN) including a fully connected network, a deep convolutional neural network (DCNN), and a recurrent neural network (RNN). The DNN may include a plurality of layers. The plurality of layers may include an input layer, at least one hidden layer, and an output layer. The neural network may be trained to perform a provided operation by mapping input data and output data having a nonlinear relationship based on deep learning. Deep learning may be a machine learning scheme for resolving an issue arising from a big data set. Deep learning may be an optimization process of a neural network that uses prepared training data to train a neural network while finding a point in which energy is minimized.

The electronic device 800, host processor 110, processor 810, memory 820, communication interface 830, and other apparatuses, units, modules, devices, and other components described herein and with respect to FIGS. 1-8, are implemented by hardware components. Examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods that perform the operations described in this application and illustrated in FIGS. 1-8 are performed by computing hardware, for example, by one or more processors or computers, implemented as described above executing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller, e.g., as respective operations of processor implemented methods. One or more processors, or a processor and a controller, may perform a single operation, or two or more operations.

Instructions or software to control computing hardware, for example, one or more processors or computers, to implement the hardware components and perform the methods as described above may be written as computer programs, code segments, instructions or any combination thereof, for individually or collectively instructing or configuring the one or more processors or computers to operate as a machine or special-purpose computer to perform the operations that are performed by the hardware components and the methods as described above. In one example, the instructions or software include machine code that is directly executed by the one or more processors or computers, such as machine code produced by a compiler. In another example, the instructions or software includes higher-level code that is executed by the one or more processors or computers using an interpreter. The instructions or software may be written using any programming language based on the block diagrams and the flow charts illustrated in the drawings and the corresponding descriptions in the specification, which disclose algorithms for performing the operations that are performed by the hardware components and the methods as described above.

The instructions or software to control computing hardware, for example, one or more processors or computers, to implement the hardware components and perform the methods as described above, and any associated data, data files, and data structures, may be recorded, stored, or fixed in or on one or more non-transitory computer-readable storage media. Examples of a non-transitory computer-readable storage medium include read-only memory (ROM), random-access programmable read only memory (PROM), electrically erasable programmable read-only memory (EEPROM), random-access memory (RAM), dynamic random access memory (DRAM), static random access memory (SRAM), flash memory, non-volatile memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, blue-ray or optical disk storage, hard disk drive (HDD), solid state drive (SSD), flash memory, a card type memory such as multimedia card micro or a card for example, secure digital (SD) or extreme digital (XD)), magnetic tapes, floppy disks, magneto-optical data storage devices, optical data storage devices, hard disks, solid-state disks, and any other device that is configured to store the instructions or software and any associated data, data files, and data structures in a non-transitory manner and provide the instructions or software and any associated data, data files, and data structures to one or more processors or computers so that the one or more processors or computers can execute the instructions. In one example, the instructions or software and any associated data, data files, and data structures are distributed over network-coupled computer systems so that the instructions and software and any associated data, data files, and data structures are stored, accessed, and executed in a distributed fashion by the one or more processors or computers.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A processor-implemented image processing method, the method comprising:
   generating appearance information corresponding to a standard space comprising a plurality of regular grids in a first input image by implementing a first neural network;
   generating geometric information corresponding to the standard space in a second input image by implementing a second neural network;
   deforming the plurality of regular grids based on the generated geometric information;
   generating standardized image information by applying the appearance information to the plurality of deformed regular grids; and
   generating an output image based on the standardized image information,
   wherein the geometric information comprises any one of scale information, offset information, and depth information.

2. The method of claim 1, wherein the standard space is a canonical space which is defined by a cube comprising the plurality of regular grids.

3. The method of claim 1, wherein the appearance information comprises any one of feature information, color information, and texture information.

4. The method of claim 1, wherein the deforming of the plurality of regular grids comprises:
   deforming coordinates corresponding to each of the plurality of regular grids based on the scale information; and
   moving the deformed coordinates based on any one of the offset information and the depth information.

5. The method of claim 1, wherein the standard space comprises a space represented by a cube form comprising five faces that are based on a one-point perspective.

6. The method of claim 1, wherein the first input image is same as the second input image.

7. The method of claim 1, wherein the first input image is different from the second input image.

8. The method of claim 1, further comprising:
receiving viewpoint information,
wherein the generating of the output image comprises generating an output image which corresponds to the received viewpoint information.

9. The method of claim 8, wherein the generating of the output image corresponding to the viewpoint information comprises:
generating the viewpoint information by applying a third input image to a fourth neural network; and
generating an output image by applying the generated viewpoint information and image information corresponding to the first input image to a third neural network.

10. The method of claim 9, wherein the applying of the image information corresponding to the first input image to the third neural network comprises:
converting the image information to a two-dimensional (2D) image; and
applying the 2D image to the third neural network.

11. The method of claim 1, wherein at least one of the first neural network or the second neural network are comprised in a neural network trained to generate the output image.

12. The method of claim 1, wherein the generating of the output image is performed using a neural network that is trained to generate an image in which a first training input image is deformed based on viewpoint information of a third training input image and dependent on a second training input image, where the first input image and the second input image respectively correspond to the first training input image and the second training input image.

13. The method of claim 1,
wherein the generating of the output image is performed by applying, to a third neural network, viewpoint information generated from a third input image by implementing, a fourth neural network and image information corresponding to the first input image, and
wherein the generating of the output image is performed using a neural network, which comprises the third neural network, that is trained to reduce a loss function that is based on a difference between a training third input image and an output training image, where the third input image and the output image correspond to the training third input image and the output training image.

14. The method of claim 1, wherein the second neural network is trained based on any one of an offset normalization loss function and a depth normalization loss function.

15. The method of claim 1, wherein the generating of the output image comprises:
generating first viewpoint information of a third input image;
deforming the first viewpoint information of the third input image based on second viewpoint information; and
generating the output image by applying image information and the deformed first viewpoint information to a third neural network.

16. The method of claim 1, wherein the output image comprises an image in which geometric information of the first input image is deformed based on one of geometric information of the second input image and an image in which appearance information of the first input image is deformed based on appearance information of the second input image.

17. The method of claim 1, wherein the generating of the standardized image information comprises:
generating the standardized image information based on the plurality of regular grids deformed based on geometric information of the first input image and appearance information of the second input image.

18. A non-transitory computer-readable storage medium storing instructions that, when executed by a processor, cause the processor to perform the image processing method of claim 1.

19. An electronic device, comprising:
one or more processors, configured to:
generate appearance information corresponding to a standard space defined by a cube comprising a plurality of regular grids in a first input image by implementing a first neural network;
generate geometric information corresponding to the standard space in a second input image by implementing a second neural network;
deform the plurality of regular grids based on the generated geometric information;
generate standardized image information by applying the appearance information to the plurality of deformed regular grids; and
generate an output image based on the standardized image information,
wherein the geometric information comprises any one of scale information, offset information, and depth information.

20. An electronic device, comprising:
one or more processors, configured to:
generate appearance information corresponding to a plurality of grids in a first standard space by applying an input image to a first neural network;
generate geometric information corresponding to each of the plurality of grids by applying the input image to a second neural network;
generating a second standard space by deforming coordinates corresponding to each of the plurality of grids based on the generated geometric information;
generate standardized image information by applying the appearance information to the second standard space;
convert the standardized information to a two-dimensional (2D) image, and apply the 2D image to a third neural network, and
generate an output image by applying the 2D image to the third neural network,
wherein the geometric information comprises any one of scale information, offset information, and depth information.

21. The electronic device of claim 20, wherein the third neural network is trained to generate the output image.

22. The electronic device of claim 20, wherein the standard space comprises a space to align a deformable scene with a space of a single viewpoint.

* * * * *